(12) United States Patent
Narayanan et al.

(10) Patent No.: US 9,628,400 B2
(45) Date of Patent: Apr. 18, 2017

(54) INTEREST FORWARDING FOR INTERACTIVE CLIENT ANONYMITY

(71) Applicant: Cisco Technology, Inc., San Jose, CA (US)

(72) Inventors: Ashok Narayanan, Lexington, MA (US); David R. Oran, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 13/949,393

(22) Filed: Jul. 24, 2013

(65) Prior Publication Data

US 2015/0032892 A1   Jan. 29, 2015

(51) Int. Cl.
*G06F 15/173* (2006.01)
*H04L 12/911* (2013.01)
*H04L 29/06* (2006.01)

(52) U.S. Cl.
CPC .......... *H04L 47/70* (2013.01); *H04L 63/0428* (2013.01); *H04L 63/0414* (2013.01)

(58) Field of Classification Search
CPC .............................. H04L 45/64; H04L 67/26
See application file for complete search history.

(56) References Cited

U.S. PATENT DOCUMENTS

| | | | |
|---|---|---|---|
| 7,533,126 B2 | 5/2009 | Oran | |
| 7,788,480 B2 | 8/2010 | Winget et al. | |
| 7,792,111 B2 | 9/2010 | Narayanan et al. | |
| 8,166,161 B1 | 4/2012 | Gannu et al. | |
| 8,493,982 B2 | 7/2013 | Borges et al. | |
| 2009/0287835 A1* | 11/2009 | Jacobson | 709/229 |
| 2011/0271007 A1* | 11/2011 | Wang et al. | 709/238 |
| 2012/0204224 A1* | 8/2012 | Wang | H04L 67/2819 726/3 |
| 2013/0029664 A1* | 1/2013 | Lee et al. | 455/435.1 |
| 2013/0282920 A1* | 10/2013 | Zhang | H04L 45/74 709/238 |

OTHER PUBLICATIONS

Van Jacobson, VoCCN: Voice-over Content-Centric Network, Dec. 2009, CoNEXT 2009, p. 1-6.*

* cited by examiner

*Primary Examiner* — Brian P Whipple
*Assistant Examiner* — Anthony Rotolo
(74) *Attorney, Agent, or Firm* — Parker Ibrahim & Berg LLC; James M. Behmke; Stephen D. LeBarron (57) ABSTRACT

In one embodiment, an intermediate node in a communication network receives a client interest with an indication of a client-requested reverse private path. The reverse private path is a label switched path toward a corresponding client with encrypted client information. In response to receiving the client interest, the intermediate node allocates a label for the reverse private path. The allocated label is mapped to a node from which the client interest is received. The intermediate node then forwards the client interest with the allocated label toward a server. In another embodiment, the server receives a client interest including a client-requested reverse private path from a particular intermediate node and determines a server interest. The allocated label for the client interest is inserted into the server interest which is forwarded toward the client via the particular intermediate node using the allocated label for the reverse private path.

14 Claims, 7 Drawing Sheets

INTEREST FORWARDING FOR INTERACTIVE CLIENT ANONYMITY

TECHNICAL FIELD

The present disclosure relates generally to computer networks, and, more particularly, to interest forwarding for interactive client anonymity.

BACKGROUND

Content-centric networking (CCN) efficiently distributes information in a network using existing infrastructure to improve traffic speed in data transmission. Specifically, in CCN, a client "interest" message includes a request for data and the networking system relies on a dynamically created state along a path to route data back to a client. The data is transmitted based on the type of content instead of geographic location and the client identifying information need not be publicly routable because the data transmitted does not need to contain a source address, thus preventing adversaries within the network from identifying the client based on the interest. However, interactive applications such as voice over IP (VoIP) require two-way communication between a server and the client, where the server typically retrieves information from the client by issuing an interest towards the client to retrieve information. Current techniques require that this interest be routed by name towards the client, thus exposing the identity of the client within the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an intermediate node in a communication network receives a client interest with an indication of a client-requested reverse private path. The reverse private path is a label switched path toward a corresponding client with encrypted client information. In response to receiving the client interest, the intermediate node allocates a label for the reverse private path. The allocated label is mapped to a node from which the client interest is received. The intermediate node then forwards the client interest with the allocated label toward a server.

According to one or more additional embodiments of the disclosure, a server receives a client interest for a client from a particular intermediate node. The client interest includes a client-requested reverse private path and an allocated label from the particular intermediate node. The server then determines a server interest for the client and generates the server interest. The allocated label for the client interest is inserted into the server interest and then the server forwards the server interest toward the client via the particular intermediate node using the allocated label for the reverse private path.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
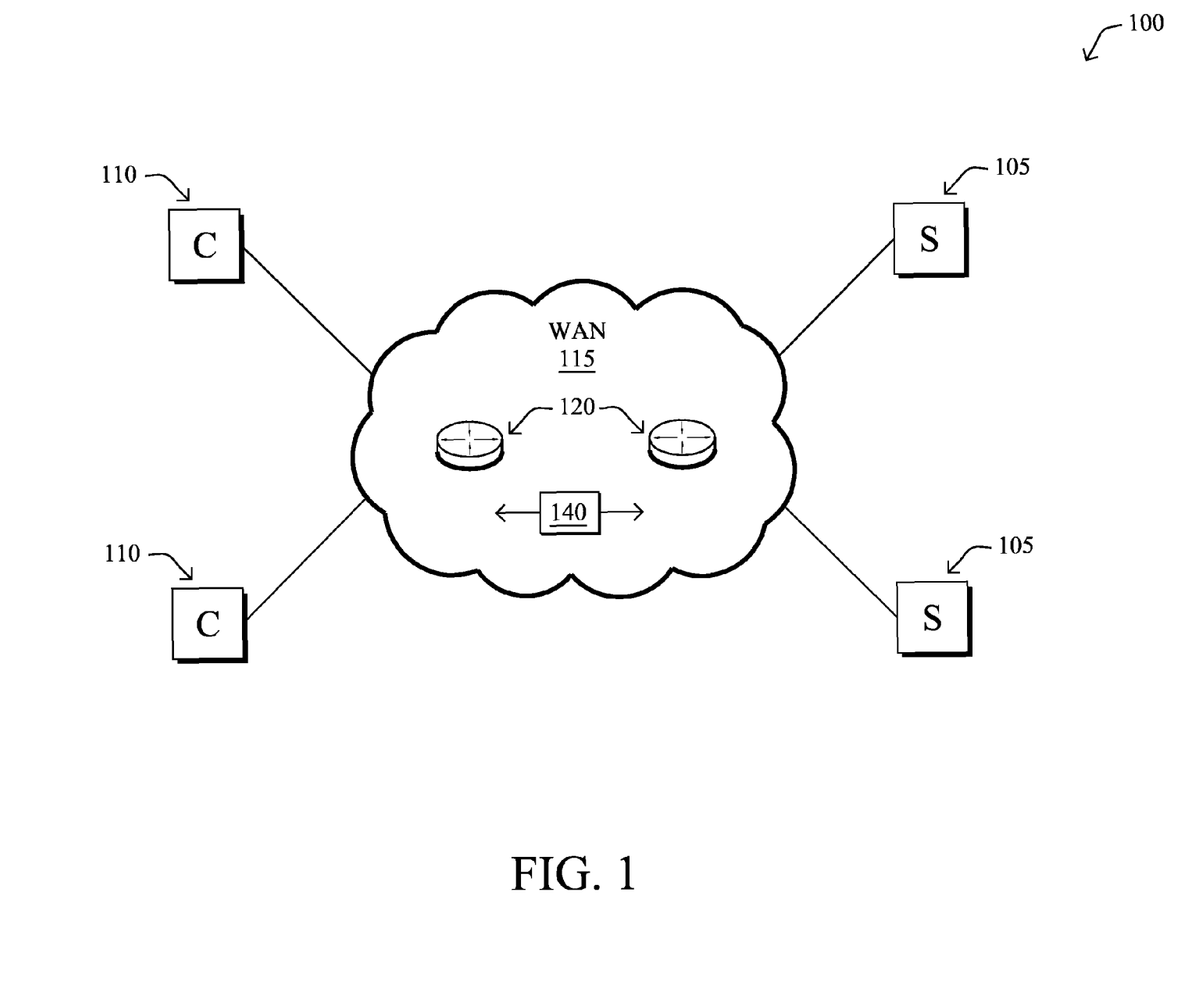
FIG. 1 illustrates an example wide area network.

FIG. 1 is a schematic block diagram of an example computer network 100 illustratively comprising various interconnected network devices (e.g., servers, routers, etc.) which may form local networks that are interconnected by a global network (e.g., the public Internet) or WAN 115, as shown. Illustratively, various client ("C") devices 110 and various servers ("S") 105 may be interconnected with the WAN 115 (and/or within respective local networks), which may comprise one or more routers 120. Those skilled in the art will understand that any number of network devices may be implemented in the computer network 100, that the network devices may be interconnected with one another in any suitable configuration, and that the view shown herein is for simplicity.

Data packets 140 may be exchanged among the network devices of the computer network 100 over links using predefined network communication protocols such as certain known wired protocols, wireless protocols, or other protocols where appropriate. In this context, a protocol consists of a set of rules defining how the devices interact with each other.

Figure 2:
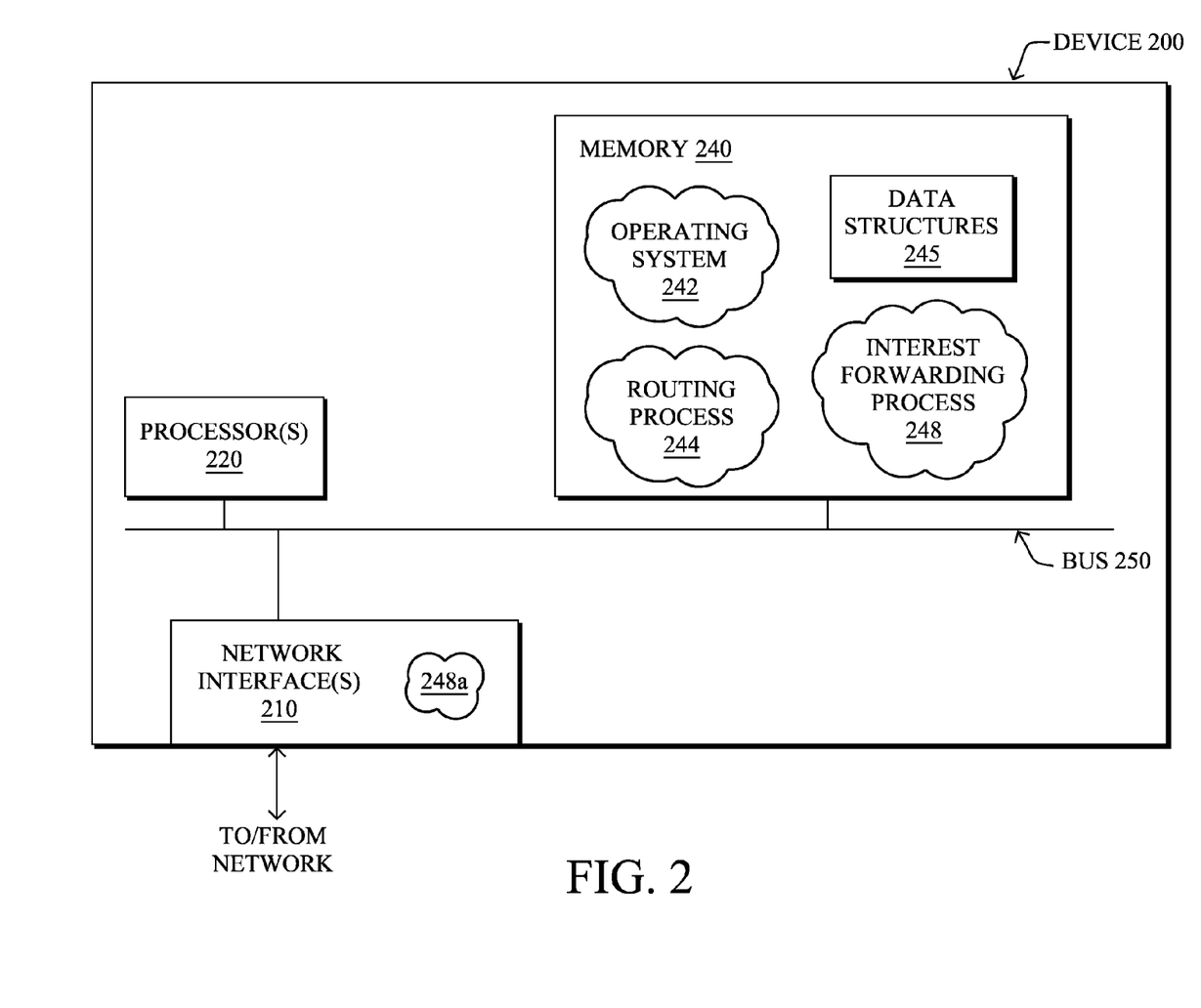
FIG. 2 illustrates an example network device/node.

FIG. 2 is a schematic block diagram of an example device 200 that may be used with one or more embodiments described herein, e.g., such as any of the client devices 110, servers 105, or routers 120 as shown in FIG. 1 above. The device may comprise one or more network interfaces 210, one or more processors 220, and a memory 240 interconnected by a system bus 250. The network interface(s) 210 contain the mechanical, electrical, and signaling circuitry for communicating data over links coupled to the network 100. The network interfaces may be configured to transmit and/or receive data using a variety of different communication protocols.

The memory 240 comprises a plurality of storage locations that are addressable by the processor(s) 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor(s), functionally organizes the device by, inter alia, invoking operations in support of software processes and/or services executing on the device. These software processes and/or services may comprise routing process/services 244 and an illustrative interest forwarding process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 contain computer executable instructions executed by the processor 220 to perform functions provided by one or more routing protocols, as will be understood by those skilled in the art. These functions may be configured to manage a forwarding table (a data structure 245) containing, e.g., data used to make forwarding decisions. In addition, routing services 244, in conjunction with interest forwarding process 248, may perform functions related to conventional protocols for content-centric networking (CCN), or similarly, information-centric networking (ICN), as will be understood by those skilled in the art.

In particular, as noted above, CCN (or ICN) routes and delivers requested interest data based on the content of the interest data and thus, an interest requested by a client does not have to be retrieved from a specific location but can be retrieved at any device in the network (e.g., the data does not have to be stored on a server). In particular, in CCN (or ICN), a client sends out an "interest" packet ("client interest") to register its interest in a particular bit of data. A first router receives that and forwards it to one or more other routers, based on its routing table, until the client interest reaches the appropriate server of the data, who replies with a response (generally: the content).

As further noted above, in CCN, the networking system relies on a dynamically created state along a path during forwarding of the client interest to route the data (content) back to a client, where client identifying information need not be publicly routable because the data transmitted does not need to contain a source address. However, interactive applications such as voice over IP (VoIP) require two-way communication between a server and the client. That is, the servers sometimes need to retrieve information from the client by issuing an interest towards the client. However, this server-to-client interest needs to be routed by name towards the client by intermediate routers, which means that the identity of the client cannot be concealed from adversaries who can see the global routing table. Notably, this is currently the only piece of identifying information in the interest which cannot be protected by encryption.

Dynamically Creating Reverse Private Paths

The techniques herein provide a method of receiving a client-requested reverse private path that is a label switched path toward a corresponding client which allows the return interest in bidirectional applications to not include unencrypted client identifying information. Thus, the client may remain anonymous in CCN and similarly, in ICN, and data may be transmitted between a source and a destination securely.

Specifically, according to one or more embodiments of the disclosure as described in detail below, an intermediate node in a communication network may receive a client interest with an indication of a client-requested reverse private path. The reverse private path is a label switched path toward a corresponding client with encrypted client information. In response to receiving the client interest, the intermediate node may allocate a label for the reverse private path. The allocated label is mapped to a node from which the client interest is received. The intermediate node may then forward the client interest with the allocated label toward a server. According to one or more additional embodiments of the disclosure, the server may receive the client interest for a client from a particular intermediate node. If the server then determines a server interest for the client, it may then generate a server interest with the allocated label for the client interest inserted therein, thus forwarding the server interest toward the client via the particular intermediate node based on the allocated label (i.e., on the reverse private path).

Illustratively, the techniques described herein may be performed by hardware, software, and/or firmware, such as in accordance with the interest forwarding process 248/248a, which may contain computer executable instructions executed by the processor(s) 220 (or independent processor of interfaces 210) to perform functions relating to the techniques described herein, e.g., in conjunction with routing process 244. For example, the techniques herein may be treated as extensions to conventional protocols, and may be processed by similar components understood in the art that execute those protocols, accordingly.

Operationally, the techniques herein involve using dynamic path creation in a network to allow a server to send interests toward a client without including client identifying information. Specifically, each intermediate node that forwards a client interest toward the server may allocate a label to the interest and the label may be mapped to a node from which the interest was received. As a result, a server interest in reverse may be forwarded toward the client without including client-identifying information, thus providing a more secure method of transmitting client data.

Figure 3:
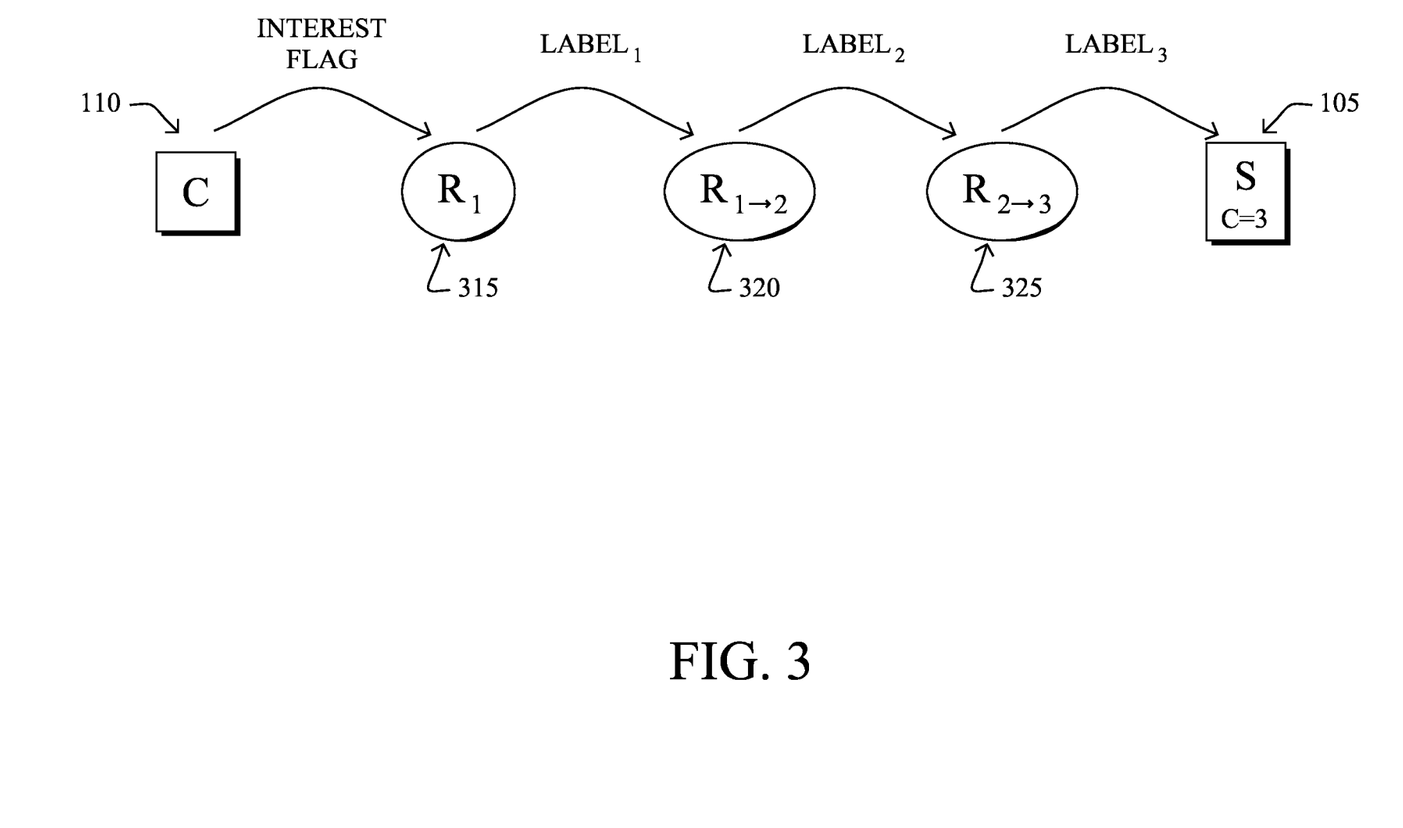
FIGS. 3-4 illustrate examples of data transmission using interest forwarding.

In one embodiment, as illustrated in FIG. 3, an intermediate node 315 in a communication network may receive a client interest from a client 110 that includes an indication of a client-requested reverse private path (e.g., a flag, code, type, etc.). As described below, the requested reverse private path creates a label switched path toward the requesting client, allowing for encrypted client identifying information. Specifically, in response to receiving the client interest, an intermediate node 315 may allocate a label (e.g., label$_1$) for the reverse private path. Notably, the label may be any identifying tag/information, such as a label in accordance with multi-protocol label switching (MPLS) label switched paths (LSPs), or otherwise. (Notably, all properties of conventional MPLS label allocation (e.g., global, per-interface, etc.) may be applied to the label switching scheme herein.) For instance, the label allocated by the intermediate node 315 may be mapped to a node from which the client interest is received (including the client itself), such that when receiving a message at that intermediate node, the label within the message directs the intermediate node to forward the message to that mapped node, accordingly.

For instance, when a next hop node 320 (or 325 when previous intermediate node 320) receives the interest with the allocated label (e.g., $label_1$), the next hop node 320 may allocate a new label (e.g., $label_2$ or $label_3$ when 325 is the next hop node) to the interest that may be mapped to the intermediate node 315 from which the client interest was received. Each next hop node along a route toward a server 105 may allocate a new label to the interest. That is, the intermediate node may be a previous intermediate node (e.g., a node that has sent an interest to a next hop node) that includes an allocated label from the previous intermediate node. Said differently, a first hop router (315) receives the client interest, allocates a local label (which results in a disposition of packets sent towards the client) and includes that label in the interest forwarded upstream. Intermediate routers on the way toward the server perform the same action, attaching a received label to the out-face of the packet in transit, allocating a local label, and replacing the old label with the locally allocated label in the client interest when forwarded upstream.

Note that in one embodiment, the label may automatically expire when the label remains unused for a predetermined amount of time (e.g., 2 minutes of "non-use"). The allocated label may also vary for different client interests from the client, thus preventing adversaries in the network from recognizing a pattern and drawing a correlation with the traffic pattern from which the client identity may be determined. Thus, to prevent a pattern from forming, the intermediate nodes may allocate new labels for different client interests (from the same client) and allocate a random life span to the labels.

Figure 4:
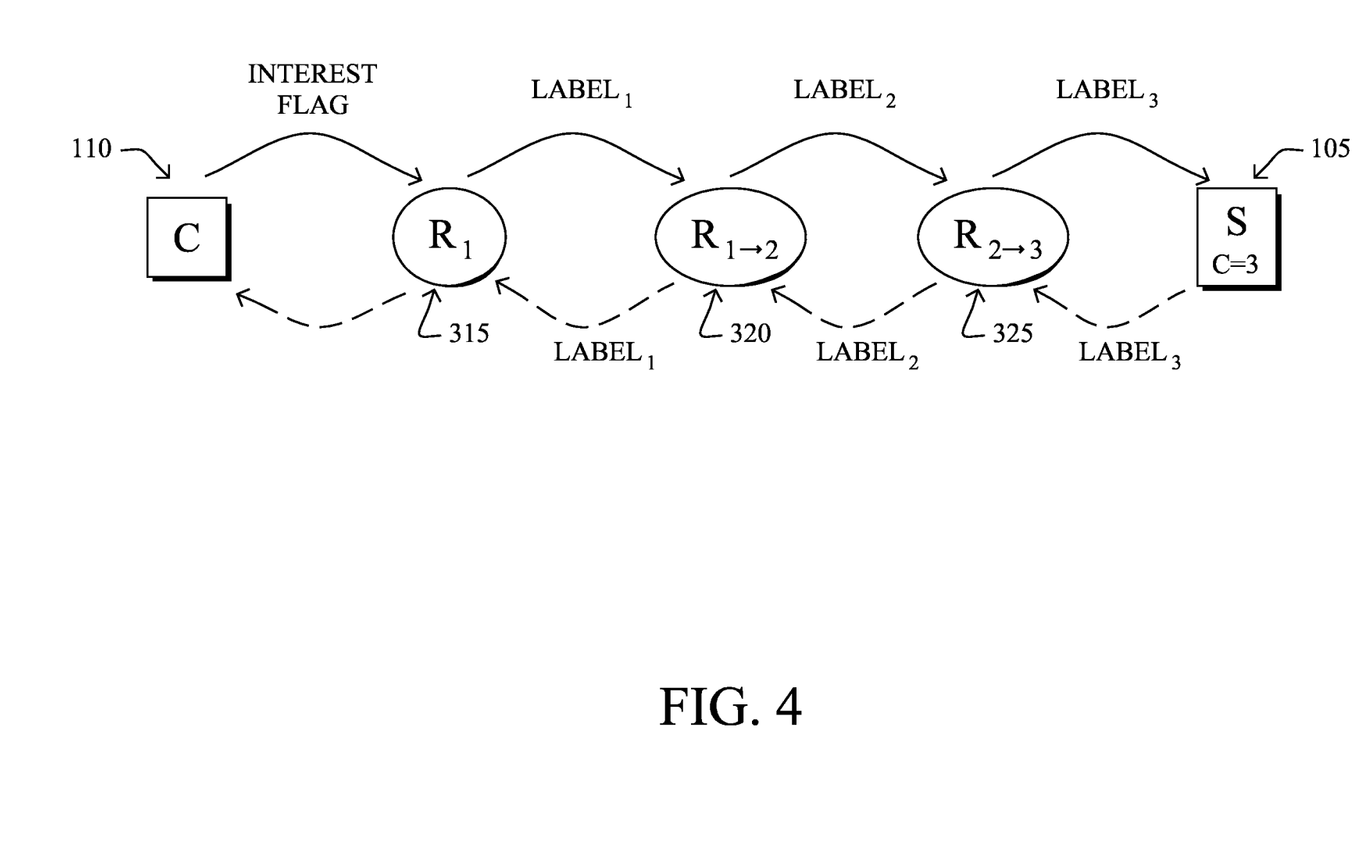

Furthermore, as shown in FIG. 4, once the server 105 has received the interest, which includes a client-requested reverse private path, from a particular intermediate node (e.g., 325) via the intermediate nodes (e.g., 315 and 320), the server 105 may store the allocated label from the particular intermediate node (e.g., $label_3$). According to the techniques herein, therefore, should the server determine that it has a server interest for the client 110, the server 105 may generate that server interest and insert the allocated label (e.g., $label_3$) into the server interest, and forwards the server interest toward the client 110 via the mapped particular intermediate node (e.g., 325) using the allocated label of the server interest. In other words, the server can now issue interests towards the client by simply encapsulating those interests with a transport label, where the intermediate routers will be able to direct the interest towards the client without looking at the name, and the server can encrypt all identifying information in the interest packet (including the name). Thus, the intermediate nodes may forward the server interest toward the client on a reverse private path without identifying the client such that adversaries in the network can no longer identify the client based on identifying information (e.g., client name and location).

In another embodiment, the client 110 may select a particular label that is a unique or large pseudo-random number ($label_u$) and include the label in the interest (perhaps for this purpose or reused for another purpose). The intermediate node 315 may receive this client interest from the client 110 that includes the indication of a client-requested reverse private path. In response to receiving the client interest, the intermediate node 315 may use the unique or pseudo-random number to be mapped to a node from which the client interest is received, such that when receiving a message at that intermediate node, the label within the message directs the intermediate node to forward the message to that mapped node, accordingly. The intermediate node 315 may forward the same label ($label_u$) in the interest to the next hop node 320 (or 325). When the next hop node 320 (or 325) receives the interest with the client-originated unique or large pseudo-random label ($label_u$), the next hop may forward the interest using the same unique label ($label_u$). In other words, rather than allocating a new label at each hop, each next hop node along a route toward the server 105 may forward the interest with the same allocated unique or large pseudo-random label ($label_u$).

Figure 5:
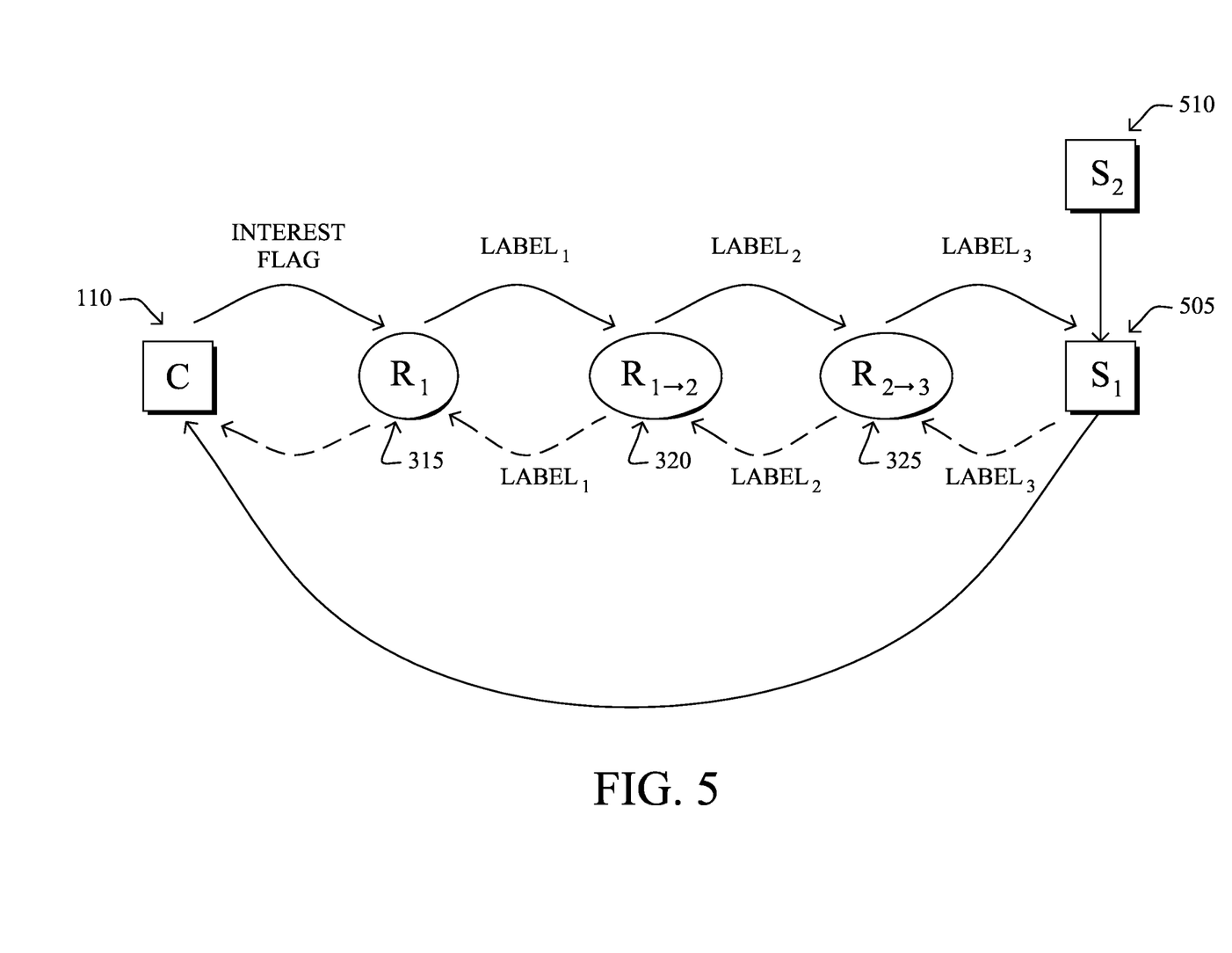
FIG. 5 illustrates an example data transmission using interest forwarding based on multiple server interests.

In yet another embodiment, as shown in FIG. 5, the client 110 may forward an interest with an indication of a client-requested reverse private path toward a first server 505 via intermediate nodes using interest forwarding, as described in the above configuration. In this embodiment, the first server 505 may then receive a server interest from a second server 510 and the first server 505 may insert the allocated label from the particular intermediate node to the server interest received from the second server 510. The server interest may then be forwarded back toward the client 110 via the particular intermediate node based on the allocated label. In other words, though the first server 505 may receive the initial client interest, and hence the established reverse private path is from the first server 505 to the client 110, if a second server 510 collaborates with the first server and wants to send a server interest toward that client, the second server may use the reverse private path to the client by sending its server interest via the first server, accordingly.

Figure 6:
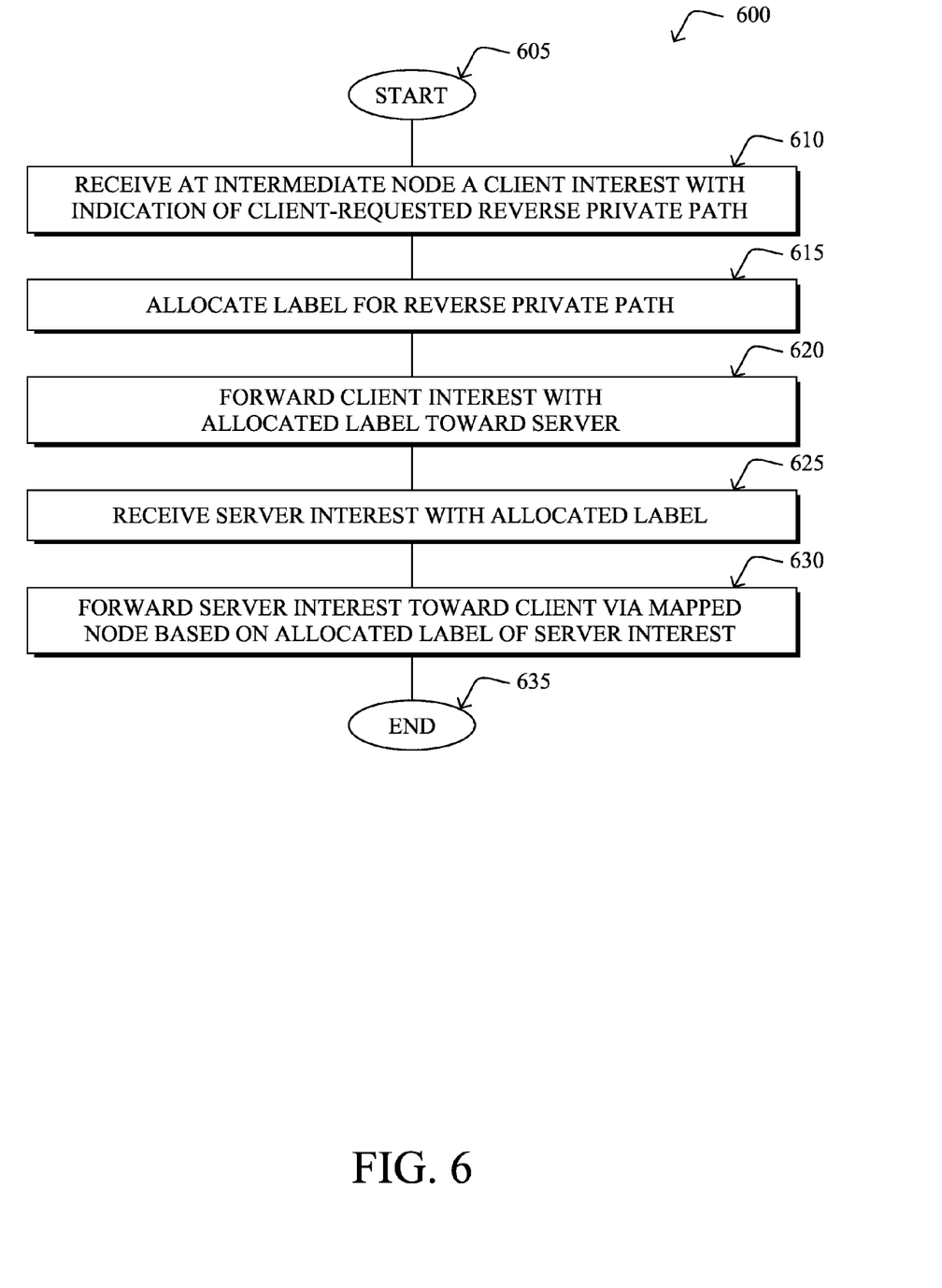
FIG. 6 illustrates an example simplified procedure for transmitting a client interest toward a server using interest forwarding for a reverse private path.

FIG. 6 illustrates an example simplified procedure for transmitting a client interest toward a server using interest forwarding for a reverse private path in accordance with one or more embodiments described herein, from the perspective of an intermediate node. The illustrative procedure 600 may start at step 605, and continues to step 610, where, as described in greater detail above, an intermediate node may receive a client interest with an indication of a client-requested reverse private path. The reverse path label may be a label switched path toward a corresponding client with encrypted client identifying information. In response to receiving the client interest, in step 615, a label may be allocated for the reverse private path and the label may be mapped to a node from which the client interest is received. In step 620, the client interest may be forwarded with the allocated label toward a server. The intermediate node may, in step 625, receive a server interest with the allocated node and in response to receiving the server interest, the intermediate node may, in step 630, forward the server interest toward the client via the mapped node based on the allocated label of the server interested. Then the procedure 600 may illustratively end in step 635.

Figure 7:
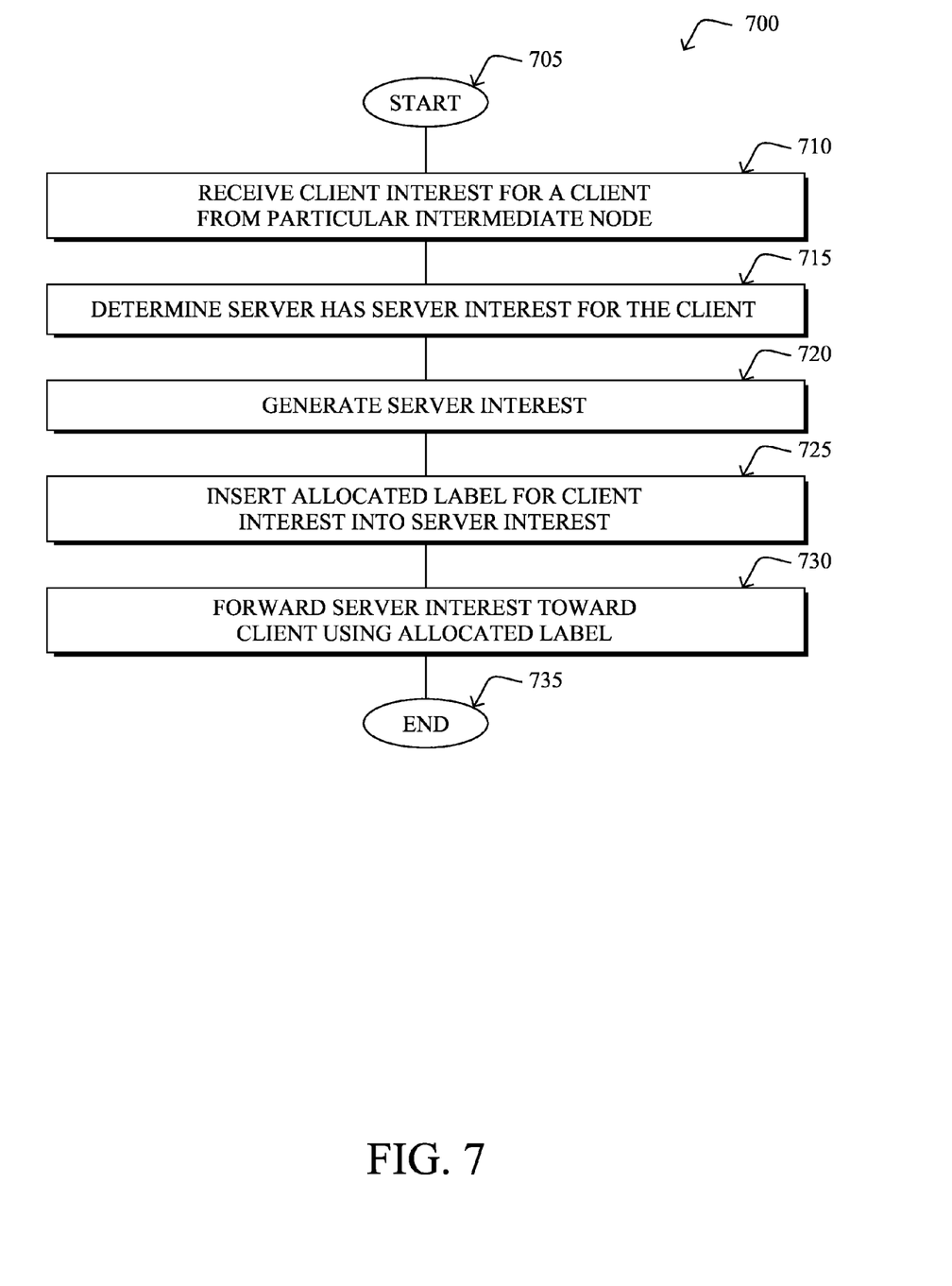
FIG. 7 illustrates an example simplified procedure for transmitting a server interest toward a client based on an allocated label.

In particular, FIG. 7 illustrates an example simplified procedure for transmitting a server interest toward a client based on an allocated label in accordance with one or more embodiments described herein, from the perspective of a server. The illustrative procedure 700 may start at step 705, and continues to step 710, where, as described in more detailed above, a server may receive a client interest for a client from a particular node. The client interest may include a client-requested reverse private path and an allocated label from the particular intermediate node. In step 715, the server may determine it has a server interest for the client and may generate, in step 720, the server interest. In addition, in step 725, the allocated label for the client interest may be inserted into the server interest. The server interest may then be forwarded, in step 730, toward the client via the particular intermediate node using the allocated label and the procedure 700 may illustratively end in step 735.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for transmitting interests with encrypted client-identifying information to prevent the identity of the client from being revealed to adversaries in the network via a global routing table. Specifically, the techniques herein may be applied to representational state transfer (RESTful) as well as bidirectional client-server applications (e.g., VoIP) and traditional fetch-only client-server applications. In addition, the intermediate devices in the network may each assign new labels to an interest, thus preventing adversaries in the network from following the path of an interest and identifying the client and server addresses. Notably, the techniques herein are straightforward to implement for any type of CCN/ICN forwarding strategy, and can be implemented on routers efficiently, offering performance improvements in forwarding even if no anonymization is required. For instance, the techniques herein provide for transmission of labeled interests which may provide faster data transmission than transmission of traditional ICN packets.

While there have been shown and described illustrative embodiments that provide for transmission of interests using label switched paths, it is to be understood that various other adaptations and modifications may be made within the spirit and scope of the embodiments herein. For example, the embodiments have been shown and described herein with CCN and ICN types of networking. However, the embodiments in their broader sense are not as limited, and may, in fact, be used with other types of networking.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at an intermediate node in a communication network, a client interest with an indication of a client-requested reverse private path, wherein the client-requested reverse private path is a label switched path toward a corresponding client with encrypted client identifying information;
    in response to receiving the client interest, allocating a label for the client-requested reverse private path, wherein the label is mapped to a node from which the client interest is received;
    forwarding the client interest with the allocated label toward a server, wherein the corresponding client remains anonymous while the client interest is transmitted between a source and a destination, and the label automatically expires after a predetermined amount of time of non-use at the intermediate node;
    receiving, at the intermediate node, a server interest by encapsulating the server interest in the allocated label, wherein a client name is encrypted in the server interest; and
    forwarding the server interest toward the client via the mapped node based on the allocated label of the server interest.

2. The method of claim 1, wherein the node is the client, and the indication is a client-flag received from the client.

3. The method of claim 1, wherein the node is a previous intermediate node, and the indication includes an allocated label from the previous intermediate node.

4. The method of claim 1, wherein the allocated label varies for different client interests from the client.

5. An apparatus, comprising:
    one or more network interfaces to communicate with a communication network;
    a processor coupled to the network interfaces and adapted to execute one or more processes; and
    a memory configured to store a process executable by the processor, the process when executed operable to:
        receive, at an intermediate node in a communication network, a client interest with an indication of a client-requested reverse private path, wherein the reverse private path is a label switched path toward a corresponding client with encrypted client identifying information;
        allocate a label for the reverse private path, in response to receiving the client interest, wherein the label is mapped to a node from which the client interest is received;
        forward the client interest with the allocated label toward a server, wherein the corresponding client remains anonymous to the intermediate nodes while the client interest is transmitted between a source and a destination and the label automatically expires after a predetermined amount of time of non-use at the intermediate node;
        receiving, at the intermediate node, a server interest by encapsulating the server interest in the allocated label, wherein a client name is encrypted in the server interest; and
        forwarding the server interest toward the client via the mapped node based on the allocated label of the server interest.

6. The apparatus of claim 5, wherein the process when executed is further operable to:
    receive, at the intermediate node, a server interest with the allocated label; and forward the server interest toward the client via the mapped node based on the allocated label of the server interest.

7. The apparatus of claim 5, wherein the node is the client, and the indication is a client-flag received from the client.

8. The apparatus of claim 5, wherein the node is a previous intermediate node, and the indication includes an allocated label from the previous intermediate node.

9. The apparatus of claim 5, wherein the label automatically expires after a predetermined amount of time of non-use.

10. The apparatus of claim 5, wherein the allocated label varies for different client interests from the client.

11. A method, comprising:
   receiving, at a server, a client interest for a client, from a particular intermediate node, the client interest including a client-requested reverse private path and an allocated label from the particular intermediate node, wherein the client-requested reverse private path is a label switched path toward a corresponding client with encrypted client identifying information;
   determining that the server has a server interest for the client;
   based on receiving the client interest:
      generating the server interest;
      inserting the allocated label for the client interest into the server interest, wherein a client name is encrypted in the server interest; and
      forwarding the server interest toward the client via the particular intermediate node using the allocated label for the reverse private path, wherein the client remains anonymous to the intermediate nodes while the client interest is transmitted between a source and a destination, wherein the label automatically expires after a predetermined amount of time of non-use.

12. The method of claim 11, wherein the allocated label varies for different client interests from the client.

13. An apparatus, comprising:
   one or more network interfaces to communicate with a communication network;
   a processor coupled to the network interfaces and adapted to execute one or more processes; and
   a memory configured to store a process executable by the processor, the process when executed operable to:
      receive a client interest for a client from a particular intermediate node, the client interest including a client-requested reverse private path and an allocated label from the particular intermediate node to form a label switched path toward a corresponding client, wherein client identifying information in the client interest is encrypted;
      determine a server interest for the client;
      based on receiving the client interest:
         generate the server interest, wherein a client name is encrypted in the server interest;
         insert the allocated label for the client interest into the server interest;
         forward the server interest toward the client via the particular intermediate node using the allocated label for the reverse private path, wherein the client remains anonymous while the client interest is transmitted between a source and a destination, wherein the label automatically expires after a predetermined amount of time of non-use.

14. The apparatus of claim 13, wherein the allocated label varies for different client interest from the client.

* * * * *